(12) United States Patent
Nogawa

(10) Patent No.: US 11,381,163 B2
(45) Date of Patent: Jul. 5, 2022

(54) RESONANT CHARGE PUMP CIRCUIT WITH SYNCHRONIZED SWITCHING

(71) Applicant: Active-Semi, Inc., Tortola (VG)

(72) Inventor: Masashi Nogawa, Sachse, TX (US)

(73) Assignee: ACTIVE-SEMI, INC., Tortola (VG)

( * ) Notice: Subject to any disclaimer, the term of this patent is extended or adjusted under 35 U.S.C. 154(b) by 67 days.

(21) Appl. No.: 16/528,487

(22) Filed: Jul. 31, 2019

(65) Prior Publication Data

US 2020/0212797 A1 Jul. 2, 2020

Related U.S. Application Data

(60) Provisional application No. 62/786,238, filed on Dec. 28, 2018.

(51) Int. Cl.
*H02M 3/00* (2006.01)
*H02M 3/07* (2006.01)
*H02M 3/158* (2006.01)

(52) U.S. Cl.
CPC ............. *H02M 3/073* (2013.01); *H02M 3/01* (2021.05); *H02M 3/158* (2013.01)

(58) Field of Classification Search
CPC .. H02M 3/07; H02M 3/073; H02M 2003/075; H02M 2003/076; H02M 2001/0009; H02M 2001/0058; H02M 1/083; H02M 3/01; H02M 3/015
See application file for complete search history.

(56) References Cited

U.S. PATENT DOCUMENTS

| | | | |
|---|---|---|---|
| 9,917,517 B1 * | 3/2018 | Jiang | H02M 1/34 |
| 10,122,256 B1 * | 11/2018 | Babazadeh | H02M 1/083 |
| 2008/0013349 A1 * | 1/2008 | Yanagida | H02M 3/073 363/60 |
| 2019/0229616 A1 * | 7/2019 | Illiano | H02M 3/158 |
| 2019/0260289 A1 * | 8/2019 | Leisten | H02M 1/32 |
| 2020/0161968 A1 * | 5/2020 | Lin | H02M 1/44 |

* cited by examiner

*Primary Examiner* — Thienvu V Tran
*Assistant Examiner* — Shahzeb K Ahmad
(74) *Attorney, Agent, or Firm* — Withrow & Terranova, P.L.L.C.

(57) ABSTRACT

A resonant charge pump circuit includes a resonant circuit having a bucket capacitor and a bucket inductor connected in series, and a switching circuit connected to the resonant circuit. The switching circuit switches to a first state that enables current to flow from an input terminal into the resonant circuit to charge the bucket capacitor and the bucket inductor, and switches to a second state that enables current to flow from the resonant circuit to discharge the bucket capacitor and the bucket inductor to an output terminal. The resonant circuit controls current flow into and out from the resonant circuit when the switching circuit switches between the states. The resonant charge pump circuit also includes a timing circuit that controls when the switching circuit switches between the states.

20 Claims, 9 Drawing Sheets

RESONANT CHARGE PUMP CIRCUIT WITH SYNCHRONIZED SWITCHING

CROSS-REFERENCE TO RELATED APPLICATIONS

This application claims the benefit under 35 U.S.C. § 119 of U.S. Provisional Application No. 62/786,238, filed on Dec. 28, 2018, and entitled "Resonant Charge Pump Circuit," which is incorporated herein by reference in its entirety.

TECHNICAL FIELD

The present invention relates generally to charge pumps, and in particular, to a high-power and high-efficiency resonant charge pump.

BACKGROUND INFORMATION

A very common requirement in electronic circuits is to convert an available DC voltage source to a lower or higher DC voltage. One way to do this is by using a charge pump circuit. The charge pump uses a capacitor as an energy-storage element. During operation, current (charge) is alternately switched and directed between two capacitors arranged so that the circuit output is twice the input, and thus functioning as a voltage-doubling boost converter. In other configurations, the charge pump acts as a voltage "divider" in half or step-down converter.

Unfortunately, a traditional charge pump circuit may not be suitable for high power applications, even though it is known to have fairly good conversion efficiency. For example, during the charge pump's switching operation, a large amount of current flows through the components in a very short time period. This is referred to as inrush current and has the potential to damage circuit elements (e.g., fusing devices or placing high stress on devices).

Therefore, it is desirable to have a high-efficiency charge pump circuit that is suitable for high power applications and that overcomes the problems associated with conventional circuits.

SUMMARY

In various embodiments a high-power and high-efficiency resonant charge pump circuit is provided. The resonant charge pump overcomes the problems associated with large inrush currents experienced by conventional circuits. Therefore, embodiments of the resonant charge pump are suitable for applications where high-power and high-efficiency are desired. As an added benefit, the resonant charge pump operates with very low electromagnetic interference (EMI).

In one embodiment, a resonant charge pump circuit is provided that includes a resonant circuit having a bucket capacitor and a bucket inductor connected in series, and a switching circuit connected to the resonant circuit. The switching circuit switches to a first state that enables current to flow from an input terminal into the resonant circuit to charge the bucket capacitor and the bucket inductor, and switches to a second state that enables current to flow from the resonant circuit to discharge the bucket capacitor and the bucket inductor to an output terminal. The resonant charge pump circuit also includes a first switching element between the input terminal and the resonant circuit and a second switching element between the resonant circuit and the output terminal, and a timing circuit that controls when the switching circuit switches between the states.

In another embodiment, an integrated circuit is provided that includes a clock generator that generates single or multiple clock signals to drive an external resonant circuit to control switch-mode power conversion. The integrated circuit also includes means for detecting phase timing of the resonant circuit such that the clock generator synchronizes the clock signals to the phase timing of the resonant circuit.

Further details and embodiments are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some exemplary embodiments of the invention, examples of which are illustrated in the accompanying drawings.

Figure 1A:
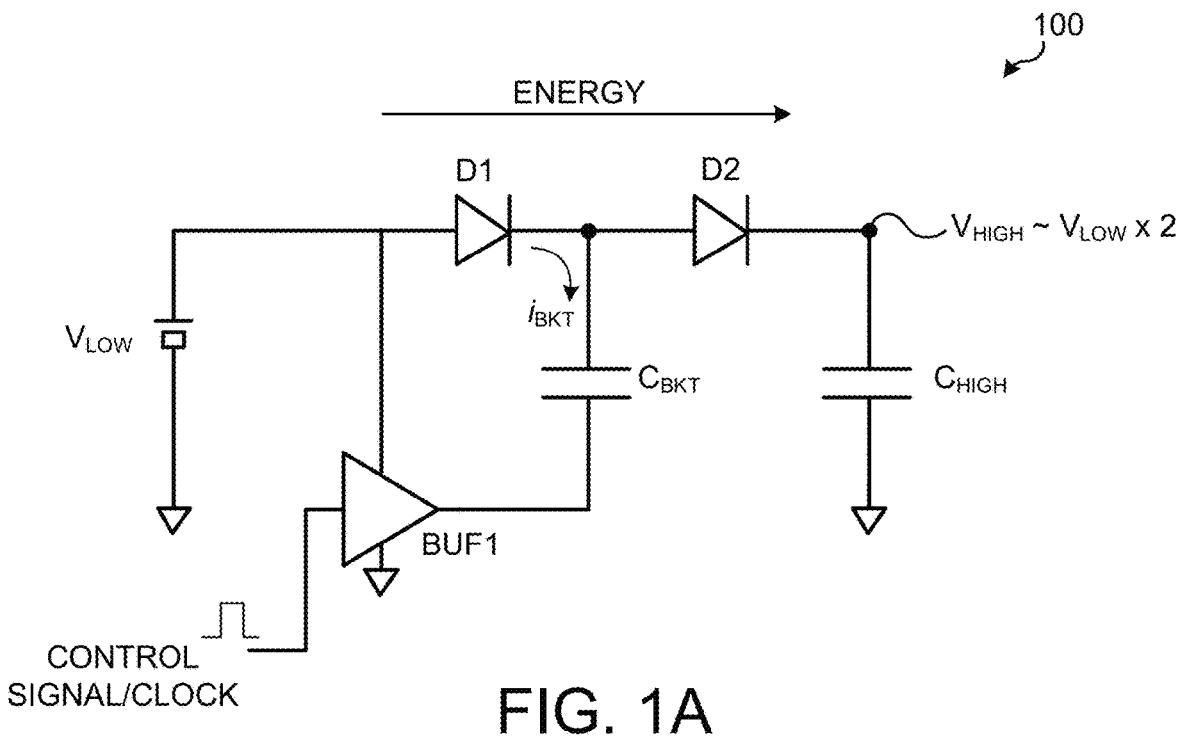
FIG. 1A shows an embodiment of a charge pump circuit.

FIG. 1A shows an embodiment of a charge pump circuit 100. The charge pump circuit 100 converts a low voltage ($V_{LOW}$) to a higher voltage ($V_{HIGH}$) where $V_{HIGH}=V_{LOW}\times 2$. A buffer (BUF1) receives a clock signal that causes the buffer output to switch between a first level at $V_{LOW}$ and a second level at ground. When the BUF1 output is at ground, a current ($i_{BKT}$) flows into a bucket capacitor ($C_{BKT}$) and charges the bucket capacitor up to the level of $V_{LOW}$. When the output of the BUF1 switches to the $V_{LOW}$ level, the voltage of the bucket capacitor is added to the BUF1 output such that the voltage level at the output of diode D2 is equal to ($2\times V_{LOW}$). Thus, the charge pump circuit 100 acts as a voltage doubler.

Figure 1B:
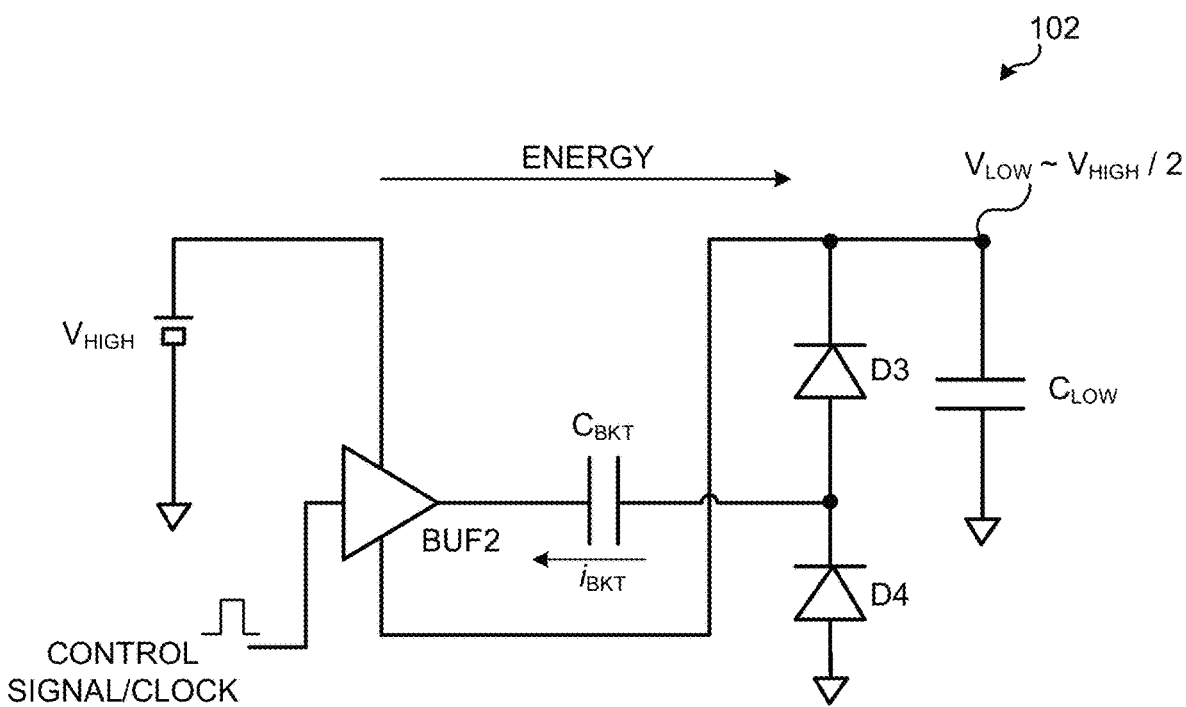
FIG. 1B shows an embodiment of a charge pump circuit.

FIG. 1B shows an embodiment of a charge pump circuit 102. The circuit 102 converts the voltage $V_{HIGH}$ to a lower voltage ($V_{LOW}$) where $V_{LOW}=V_{HIGH}/2$. The circuit 102 performs in a similar manner to the circuit 100 but operates to reduce the input voltage $V_{HIGH}$ to the output voltage ($V_{LOW}$). Thus, the circuit 102 acts as a voltage divider or step-down charge pump. The two circuits (100 and 102) are symmetrical and have similar disadvantages when used in high power applications. For example, the two circuits experience large inrush currents when the buffer switches state. These large inrush current can damage circuit components. This issue is illustrated in greater detail below.

Figure 2A:
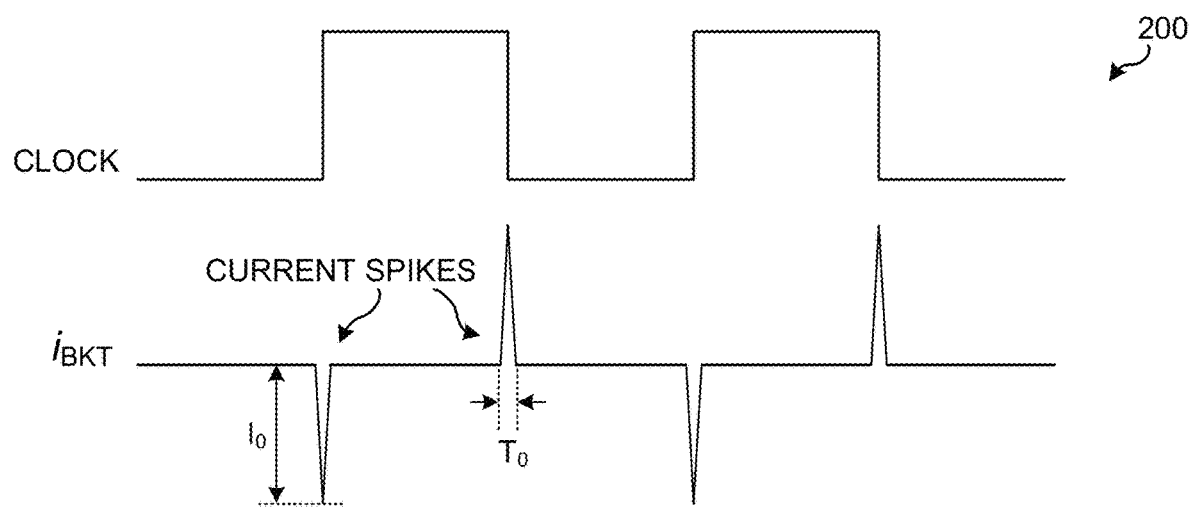
FIG. 2A show diagrams that illustrate current flow through the charge pump circuit shown in FIG. 1A.

FIG. 2A show diagrams 200 that illustrate current flow through the charge pump circuit 100 shown in FIG. 1A. The diagrams 200 show the clock signal and the bucket current $i_{BKT}$. As can be seen from the diagrams 200, when the clock signal switches state, the bucket current $i_{BKT}$ experiences a large current spike. These current spikes have very large amplitude ($I_0$) and occur over a very short time duration ($T_0$). In high power applications, these current spikes can become very large. If this charge pump circuit is used in high power applications, an additional circuit would be needed to avoid the huge inrush currents, otherwise the inrush currents could damage circuit elements (fusing devices or placing high stress on devices) that may shorten product life. Thus, it is desirable to have a way to control or reduce the inrush current spikes.

Figure 2B:
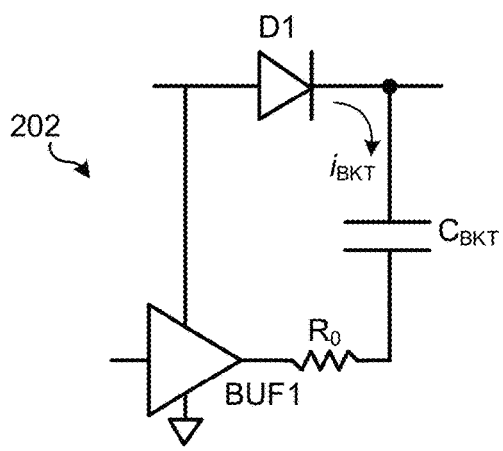
FIG. 2B shows an alternate embodiment of the charge pump circuit shown in FIG. 1A that reduces inrush currents.

FIG. 2B shows an alternate embodiment of the charge pump circuit 100 shown in FIG. 1A that reduces inrush currents. For example, a resistor is added to the charge pump circuit 100 shown in FIG. 1A to control or reduce inrush current spikes. For example, the circuit 202 illustrates how a resistor ($R_0$) is added to the output of BUF1. The resistor $R_0$ reduces the inrush current since the inrush current through $R_0$ generates a voltage drop that reduces the voltage across $C_{BKT}$. However, use of the resistor ($R_0$) also reduces conversion efficiency.

Figure 2C:
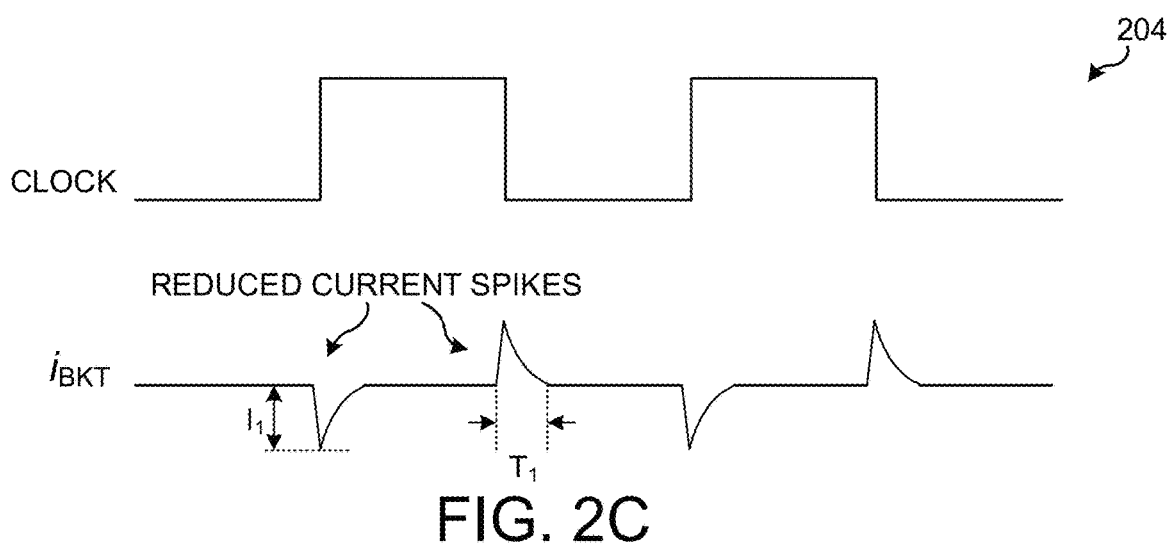
FIG. 2C shows diagrams that illustrate the operation of the charge pump circuit shown in FIG. 1A with the addition of the resistor $R_0$.

FIG. 2C shows diagrams 204 that illustrate the operation of the circuit 100 with the addition of the resistor $R_0$. The diagrams 204 show the clock signal and the bucket current $i_{BKT}$. As can be seen from the diagrams 204, when the clock signal switches state, the bucket current $i_{BKT}$ experiences a reduced current spike. For example, the current spikes have amplitude ($I_1$) that is smaller than ($I_0$) and less likely to damage circuit components. These smaller spikes occur over a time duration ($T_0$) that has a time-constant based on $R_0$ and $C_{BKT}$, which is longer than ($T_0$). Thus, with the addition of the resistor $R_0$, it is possible to use the charge pump circuits shown in FIG. 1A in high voltage applications. However, it should be noted that the resistor $R_0$ also reduces conversion efficiency of the charge pump circuit. Therefore, it is desirable to have a way to control or reduce current spikes without affecting the efficiency of the charge pump circuit.

Resonant Charge Pump Circuit

Figure 3A:
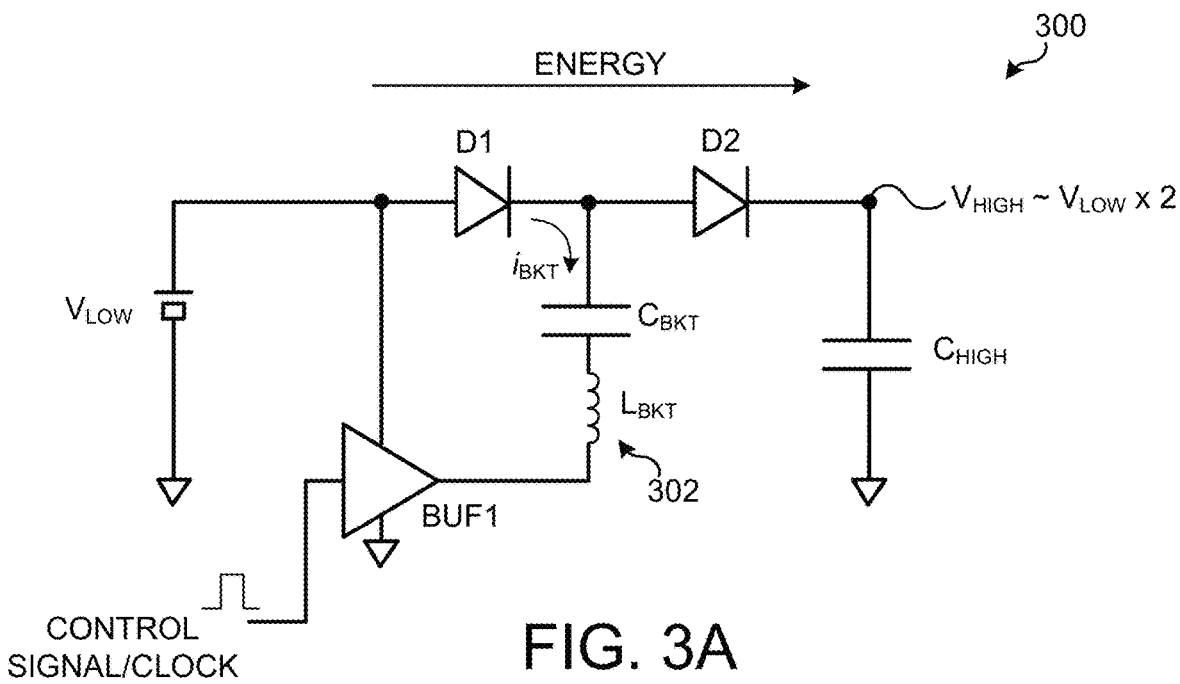
FIG. 3A shows an embodiment of a resonant charge pump circuit.

FIG. 3A shows an embodiment of a resonant charge pump circuit 300. The resonant charge pump circuit 300 converts a low voltage ($V_{LOW}$) to a higher voltage ($V_{HIGH}$) where $V_{HIGH}=V_{LOW}\times2$. The resonant charge pump circuit 300 is similar to the charge pump circuit 100 shown in FIG. 1A except that an inductor (or coil) $L_{BKT}$ 302 has been added at the output of BUF1. The inductor $L_{BKT}$ 302 combines with the capacitor $C_{BKT}$ to form a resonant circuit that operates to control or reduce the current spikes. In exemplary embodiments, an LC resonant circuit produces current flow that is sinusoidal in shape, and therefore the inrush current problem is solved. Since the resonant circuit has no resistance or power loss, it is suitable to control or reduce the current spikes in charge pump circuits even in high power applications.

Figure 3B:
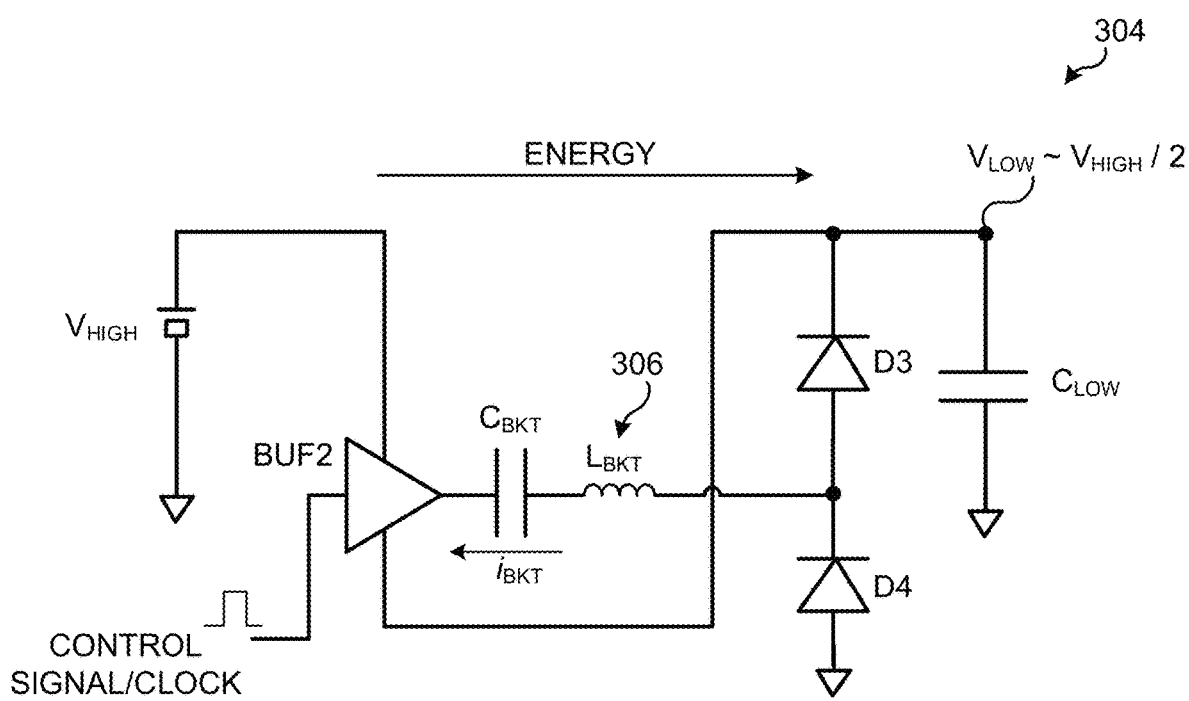
FIG. 3B shows an embodiment of a resonant charge pump circuit.

FIG. 3B shows an embodiment of a resonant charge pump circuit 304. The circuit 304 converts the voltage $V_{HIGH}$ to a lower voltage ($V_{LOW}$) where $V_{LOW}=V_{HIGH}/2$. The circuit 304 is similar to the charge pump circuit 102 shown in FIG. 1B except that an inductor (or coil) $L_{BKT}$ 306 has been added at the output of BUF2. It should be noted that although the inductor 306 is located on the opposite side of $C_{BKT}$, the effects of the resonant circuit are the same as in the resonant charge pump circuit 300.

Figure 4:
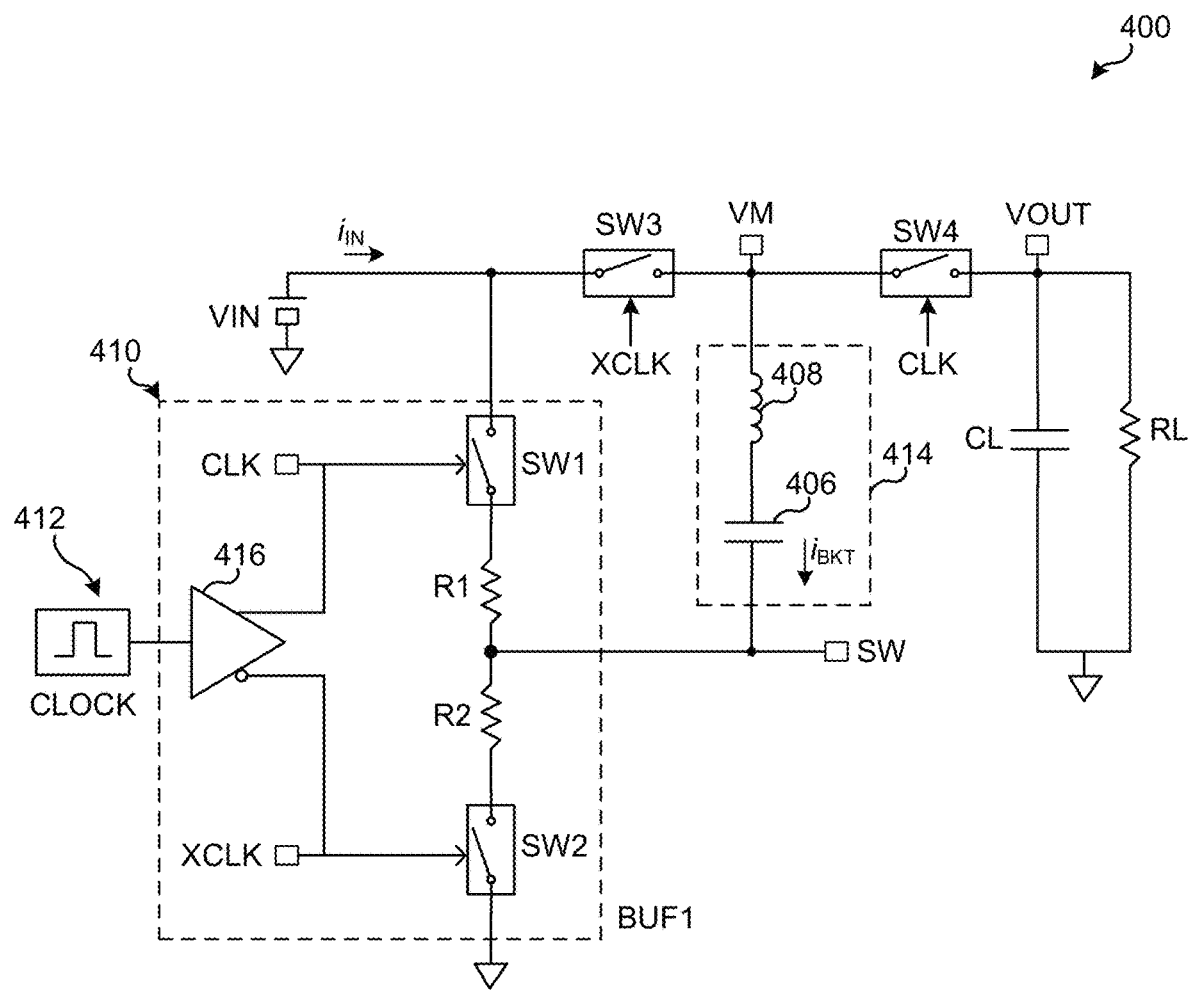
FIG. 4 shows an embodiment of a resonant charge pump circuit that simulates the operation of a resonant charge pump circuit shown in FIG. 3.

FIG. 4 shows an embodiment of a resonant charge pump circuit 400 that simulates the operation of the resonant charge pump circuit 300 shown in FIG. 3. With the goal of high power applications in mind, the circuit 400 includes transistors SW3 and SW4 that replace diodes D1 and D2. The circuit 400 also includes a switching circuit 410 that comprises buffer 416, transistors switches SW1, SW2 and resistors R1, R2. The circuit 400 also includes output load capacitor CL and resistor RL.

The transistors SW3 and SW4 are synchronized to a control clock signal 412. The circuit 400 also includes bucket capacitor ($C_{BKT}$) 406 and bucket inductor ($L_{BKT}$) 408 that form an LC resonant circuit 414 that maintains its self-oscillation for a long time period (ideally, forever oscillation) until parasitic resistance converts resonant energy into heat. The switching circuit 410 functions as BUF1 to receive the clock signal 412 and generate an output (SW) that switches state between $V_{low}$ and ground in response to the clock signal 412.

The self-resonant LC circuit 414 delivers the energy back and forth to the node VM. To maintain the direction of energy delivery, the timing of the switching needs to be synchronized to the LC resonant frequency. As a result, the circuit 400 receives a low input voltage (Vin) (e.g., 12 volts) and generates a high output voltage (Vout) that is approximately twice the input voltage (2×Vin). The operations of the resonant charge pump circuit 400, both synchronized and unsynchronized, are shown in FIGS. 5-6, respectively.

Figure 5:
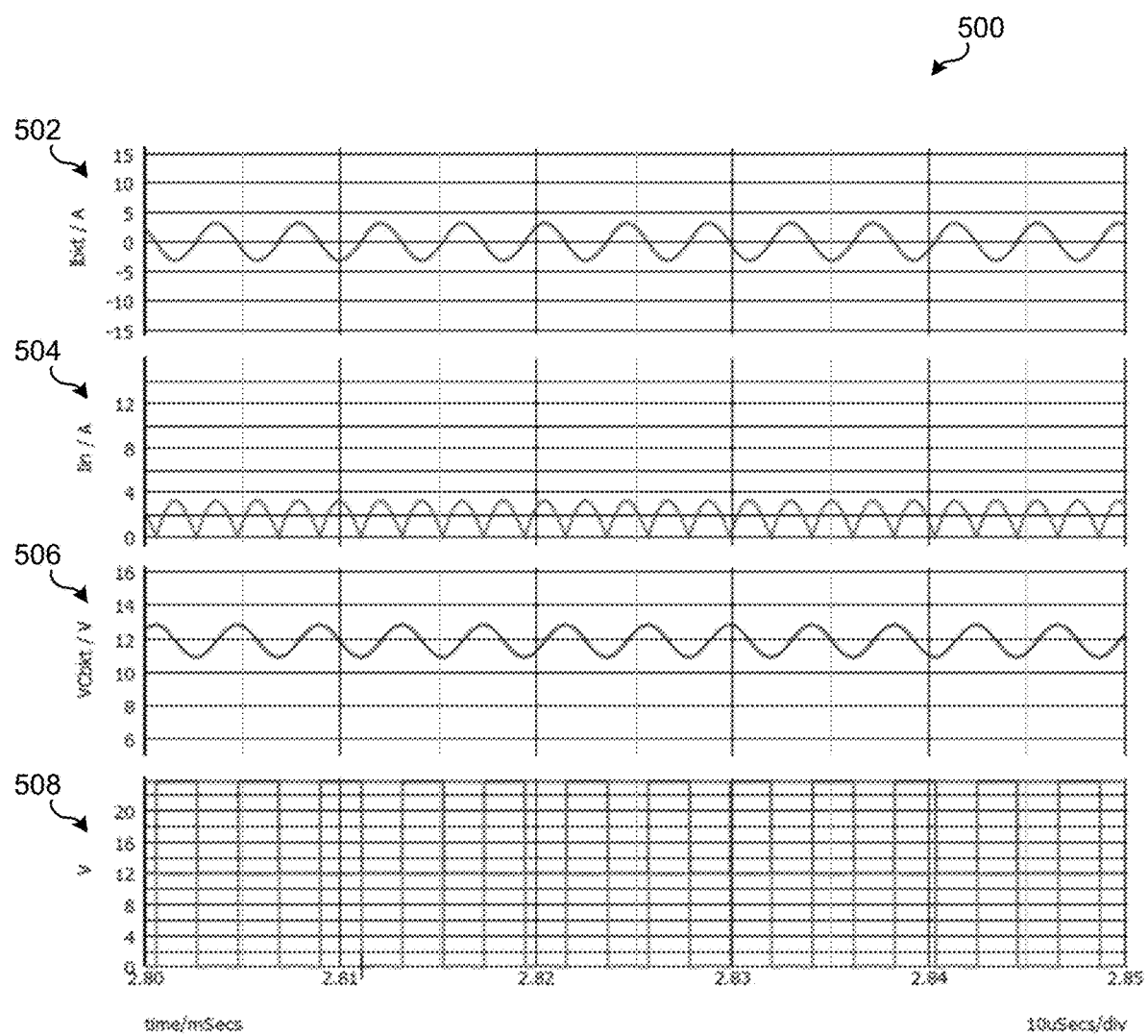
FIG. 5 shows graphs that illustrate voltage and current waveforms associated with synchronized operation of the resonant charge pump circuit shown in FIG. 4.

FIG. 5 shows graphs 500 that illustrate voltage and current waveforms associated with synchronized operation of the resonant charge pump circuit 400 shown in FIG. 4. For example, graphs 500 include graph 502 showing $i_{BKT}$ current, graph 504 showing input current (iin), graph 506 showing voltage across $C_{BKT}$ 406, and graph 508 showing output voltage (Vout). As illustrated in the graph 502, the resonant circuit ($C_{BKT}$, $L_{BKT}$) has eliminated large current spikes on the $i_{BKT}$ current. For example, the graph 502 shows a perfectly sinusoidal $i_{BKT}$ current waveform. Thus, the resonant circuit suppresses current spikes when BUF1 (switching circuit) switches between the first and second states. It should be noted also that the graph 508 of the output voltage shows that the output voltage (e.g., 24 volts) remains constant at ($2\times V_{LOW}$). These results show that the synchronized resonant circuit reduces or eliminates large inrush current thereby allowing the resonant charge pump circuit to be used in high power applications.

Figure 6:
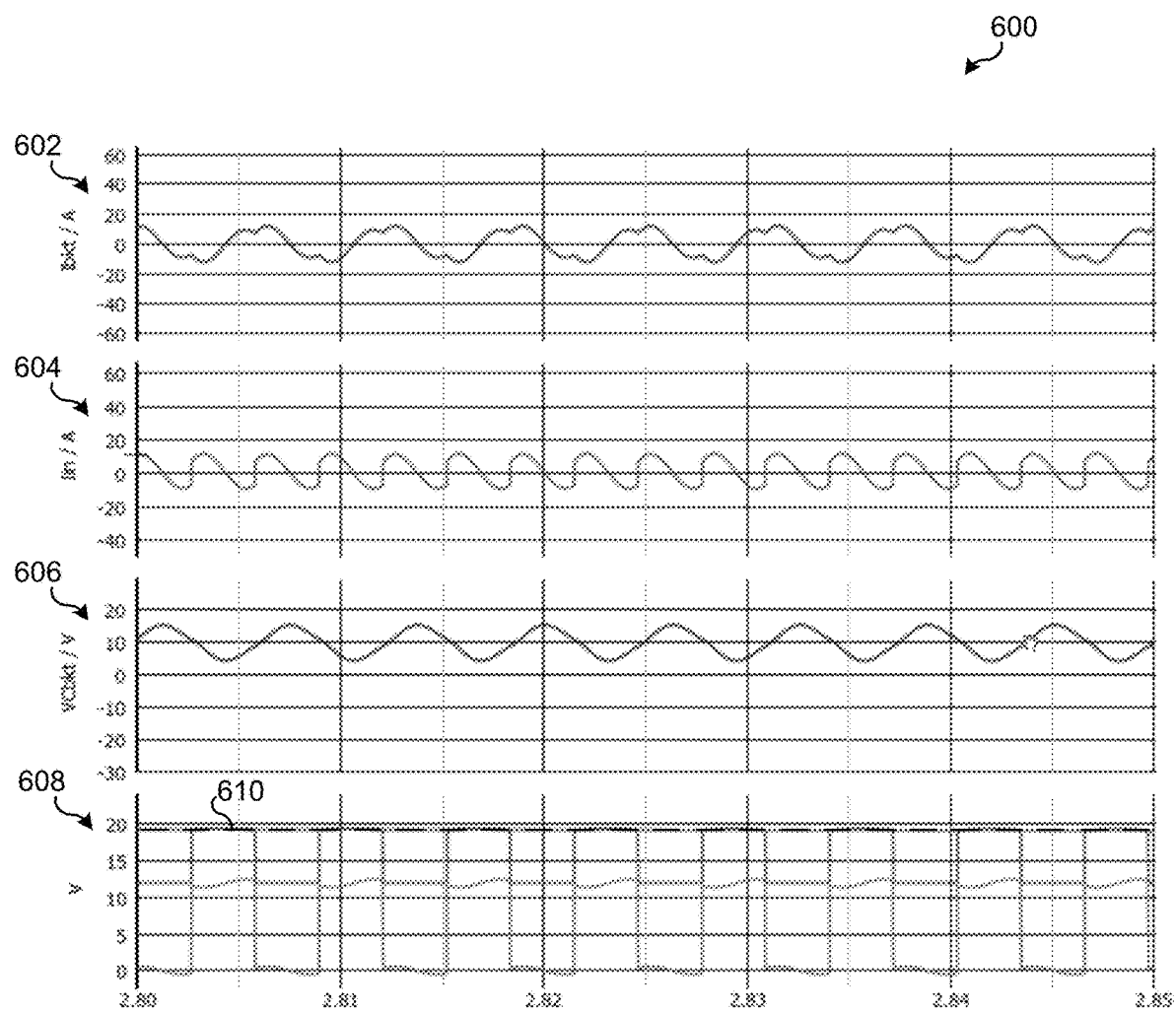
FIG. 6 shows graphs that illustrate voltage and current waveforms associated with unsynchronized operation of the resonant charge pump circuit shown in FIG. 4.

FIG. 6 shows graphs 600 that illustrate voltage and current waveforms associated with unsynchronized operation of the resonant charge pump circuit 400 shown in FIG. 4. For example, graphs 600 include graph 602 showing $i_{BKT}$ current, graph 604 showing input current (iin), graph 606 showing voltage across $C_{BKT}$ 406, and graph 608 showing output voltage (Vout). As can be seen from the graph 608, the output "dashed line" 610 is below 20V (and not 24 volts) because of the unsynchronized energy delivery of the LC circuit. Thus, it is desirable to have a way to maintain synchronization of the resonant charge pump circuit to obtain proper operation as illustrated in FIG. 5.

Resonant Charge Pump Synchronization

Figure 7:
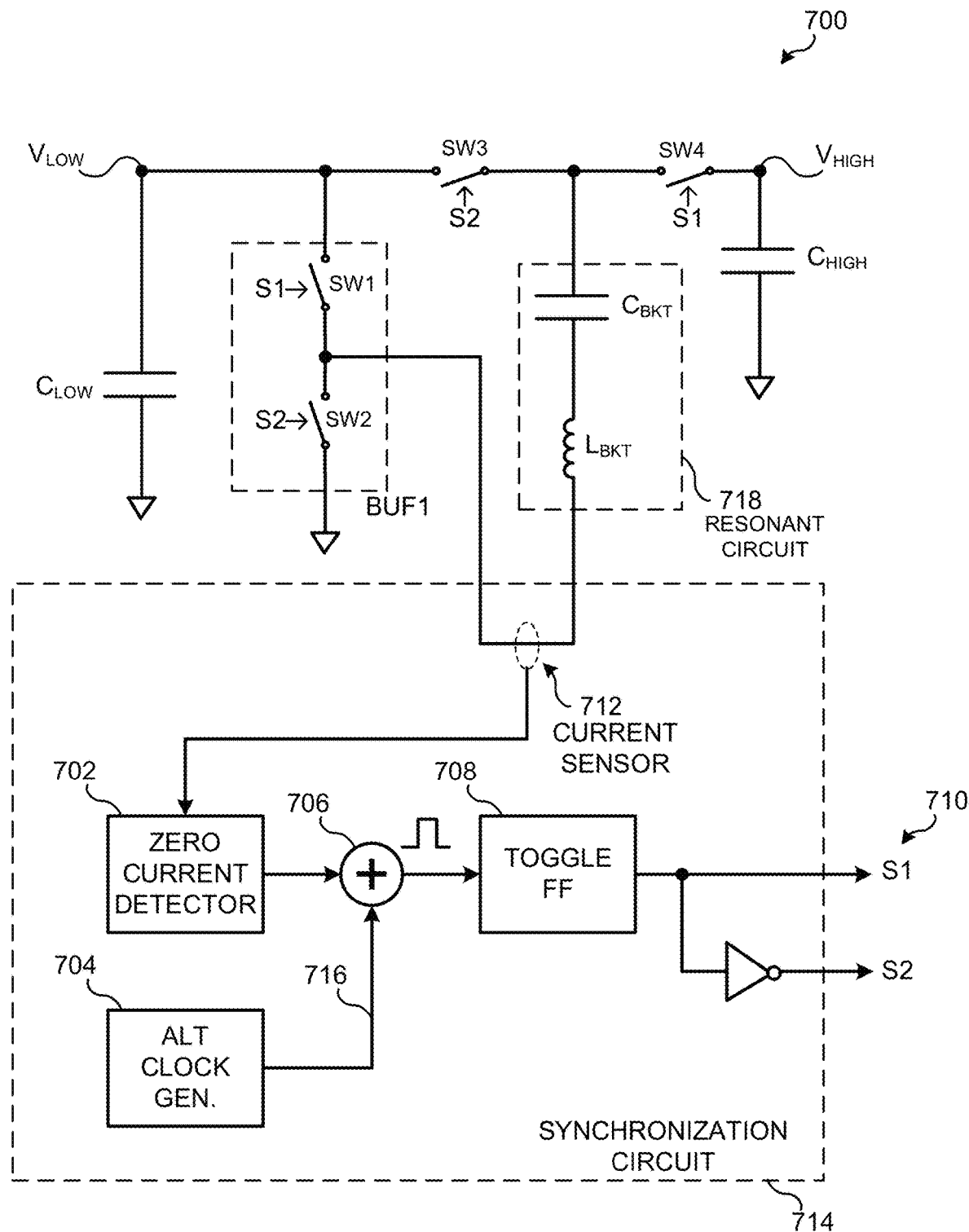
FIG. 7 shows an embodiment of a resonant charge pump circuit that includes a synchronization circuit.

FIG. 7 shows an embodiment of a resonant charge pump circuit 700 that includes a synchronization circuit 714. In one embodiment, a current sensor 712 senses current on the BUF1 output. The sensed current is input to a zero-current detector 702 that detects zero-current events on the BUF1 output. Detection pulses associated with the detected zero-current events are input to an "OR" device 706 that also receives a clock signal from an alternate clock generator 704 (discussed in greater detail below). During normal operation, the detection pulses output from the detector 702 flow through the OR device 706 and are input to a toggle flip flop (FF) 708. The output of the FF 708 is used to generate complementary synchronized clock signals S1 and S2 that drive the switches (SW 1-4) of the resonant charge pump circuit 700. In another mode of operation, if the detector 702 fails to detect zero-current events, the alternate clock generator 704 generates an alternate clock 716 that passes through the OR device 706 to the input of the toggle FF 708. Thus, in the case of low current through the LC circuit, such that no zero-current events are detected, the alternate clock generator 704 generates the clock signals used by the resonant charge pump circuit. In one embodiment, the synchronization circuit 714 is implemented on an integrated circuit.

During operation of the resonant charge pump circuit 700, the direction of energy delivery is maintained by detecting the zero-current flow timing of the LC resonant circuit 718. In one embodiment, when zero-current events of the LC resonant circuit 718 are detected, synchronized control clocks (S1, S2) change state from high-to-low or low-to-high. Appropriately changing the state of the control clocks results in current flow in one direction.

Alternate Clock Generator

When a load of the resonant charge pump circuit 700 becomes very small, it may become difficult for the zero-current detector 702 to detect "zero current" events because current delivered by the LC resonant circuit 718 may fall below the detection threshold. In this case, the alternate clock generator 704 operates to keep the circuit pumping. In one embodiment, a simple logic timing circuit can be used to generate the alternate clock 716. When no detection pulses are output from the zero-current detector 702, the alternate clock generator 704 start its timer and maintains periodic S1/S2 flipping. In this condition, the load current is very small, it is of little effect if the alternate clock timing is synchronized or not. It is preferable to set this alternate clock period almost equal to or slightly longer than the LC resonant design target.

In various embodiments, the "zero-current sense" circuit may have a certain limit on its detection range. This is a case of light to zero load current from the output side (either one of $V_{LOW}$ or $V_{HIGH}$) depending on step-down or step-up pumping operation.

In a light-load condition, because of almost negligible current flow between the input and output sides, maintaining accurate LC resonant frequency timing on the control clock signals S1 and S2 is not required. It is desirable to supply approximate timing on the clock signals S1 and S2 to maintain the output voltage. Thus, the alternate clock generator 704 maintains clocking of the S1 and S2 signals while the zero-current sensing circuit is out of operation (sensing).

Figure 8:
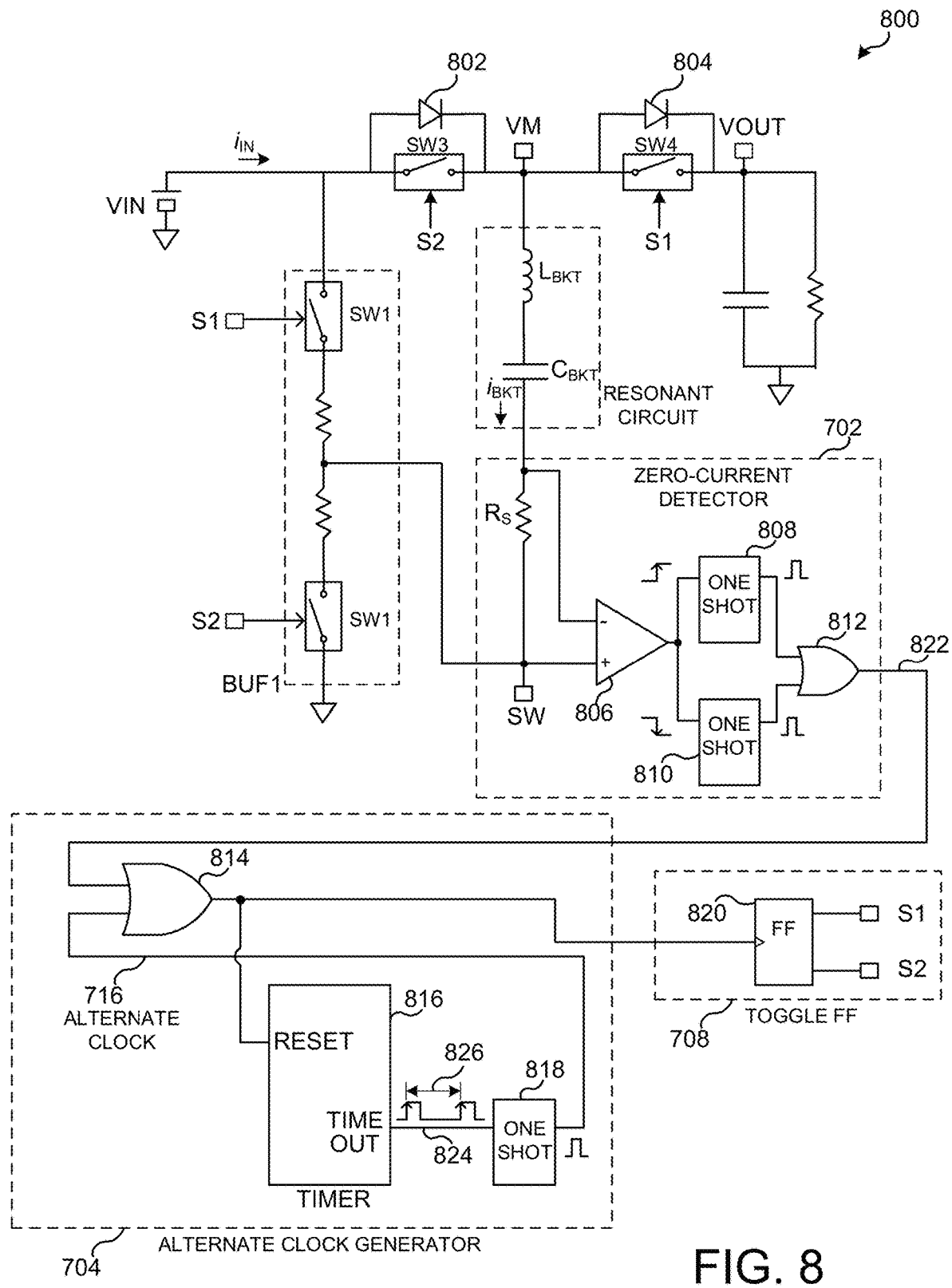
FIG. 8 shows an embodiment of a resonant charge pump circuit with synchronization.
Figure 9:
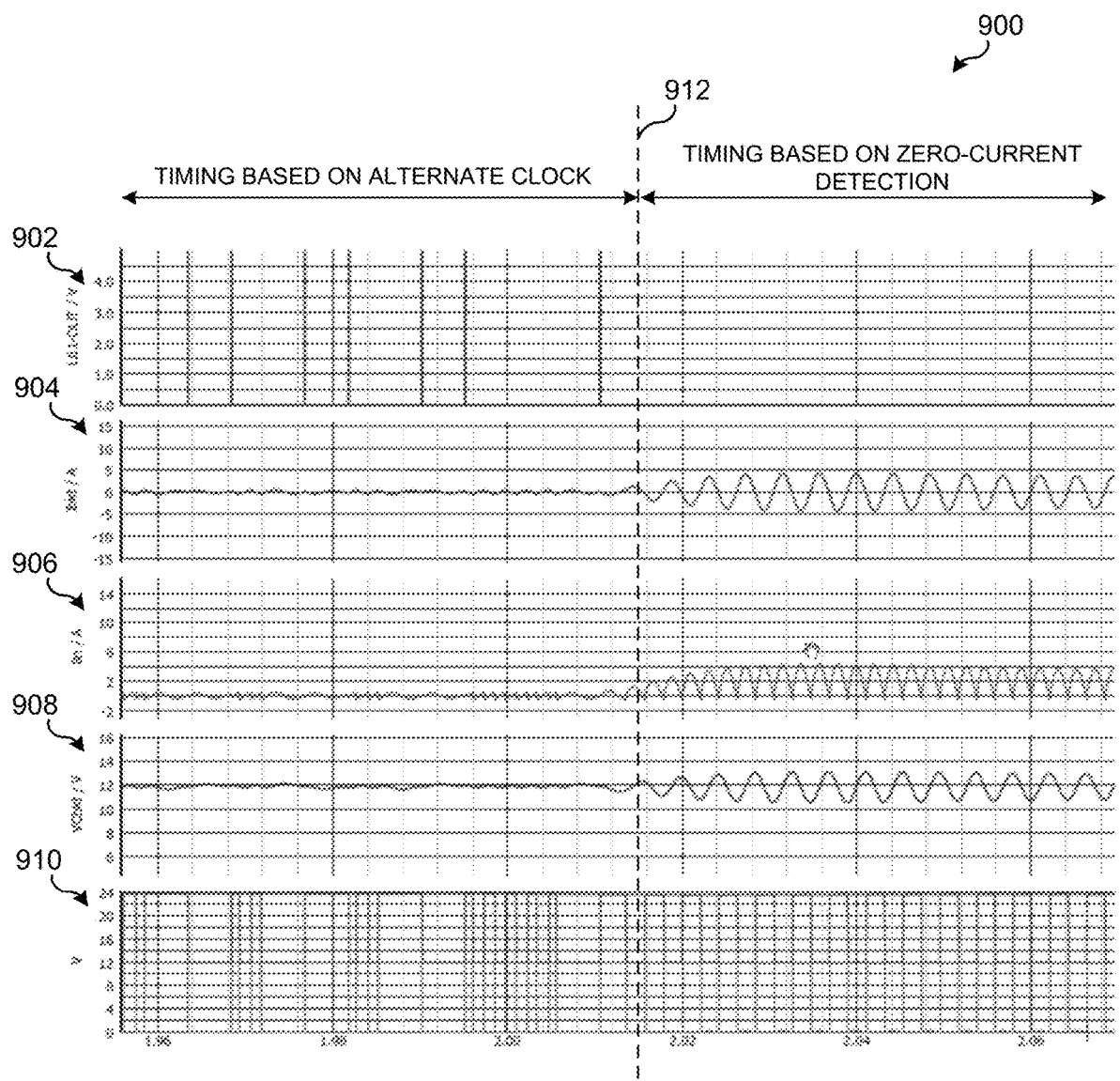
FIG. 9 shows graphs that illustrate voltage and current waveforms associated with the resonant charge pump circuit shown in FIG. 8.

FIG. 8 shows an embodiment of a resonant charge pump circuit 800 with synchronization. In one embodiment, the circuit 800 is an implementation of the circuit 700 shown in FIG. 7. The circuit 800 includes the zero-current detector 702, alternate clock generator 704, and toggle FF 708. The results of the operation of the resonant charge pump circuit 800 are shown in FIG. 9. In one embodiment, the zero-current detector 702, alternate clock generator 704, and toggle FF 708 are implemented on an integrated circuit.

As discussed above, if there is very small current into the LC circuit, the zero-current detector 702 may not detect zero current events properly. In one embodiment, two diodes (802, 804) are inserted across the transistors (SW3, SW4) that function as diodes D1 and D2 shown in FIG. 1A. In one embodiment, it may be preferable to stop using transistors SW3 and SW4 when the alternate clock 716 is driving the S1 and S2 signals. The diodes (802, 804) maintain the output voltage during this time. Since this is a light-load condition, there is no need to worry about power loss. The diodes (802, 804) can suppress unneeded LC resonant ringing during the light-load condition. In one embodiment, the diodes (802, 804) are body diodes that are part of FET transistors used as SW3 and SW4.

As illustrated in FIG. 8, the zero-current detector 702 comprises a sense resistor (Rs), comparator 806, a rising edge triggered one shot 808, a negative edge triggered one shot 810 and an OR gate 812. During operation, zero current events are detected as changing voltage across the sense resistor Rs that are input to the comparator 806. The comparator 806 responds by outputting either a rising edge or falling edge signal that triggers one of the one shots 808, 810 to output a pulse to the OR gate 812. The OR gate 812 passes this pulse as a trigger pulse 822 to the alternate clock generator 704.

As illustrated in FIG. 8, the alternate clock generator 704 comprises a timer circuit 816, one-shot circuit 818, and OR gate 814. The timing period 826 of the timer circuit 816 is set to be longer than the expected LC resonant frequency (including coil and capacitor tolerance). As long as the zero-current detector 702 outputs a trigger pulse 822 when there is a current flow direction change (e.g., zero-current sensing), the timer 816 will be reset and the timing of the clock signals S1 and S2 remains under the control of the zero-current sense circuit 702.

When in a light-load condition, the zero-current detector 702 fails to detect zero-current events and stops sending trigger pulses 822. At this point, the timer 816 is allowed to complete its timing cycle (timer runs out) and initiates a trigger pulse from the one-shot 818. The output of the one shot 818 form the alternative clock 716 that flows through the OR gate 814 to toggle the flip-flop 820 and the clocks S1 and S2 to maintain the charge pump output. The pulse output of OR gate 814 also restarts the timer 816 so that the cycle of clocking S1 and S2 is repeated. Since the time period 826 provided by the timer 816 is set to be longer than the main LC resonant timing, as soon as the resonant charge pump circuit gets out from the light-load condition, the zero-current sensing circuit 702 takes over control of the timing of the S1 and S2 signals.

FIG. 9 shows graphs 900 that illustrate voltage and current waveforms associated with the resonant charge pump circuit shown in FIG. 8. For example, the graphs 900 include graph 902 that shows the alternate clock 716, graph 904 that shows $i_{BKT}$ current, graph 906 that shows input current fin, graph 908 that shows voltage across the bucket capacitor ($C_{BKT}$), and graph 910 that shows the output voltage (Vout) of the resonant charge pump.

As illustrated in graph 902, the alternate clock 716 provides clock pulse signals when the load current is small, for example, as indicated by the input current shown in graph 906. When the load current increases and zero-current events begin to occur (shown at time indicator 912) the zero-current detector 702 and the LC resonant circuit take over to generate synchronized clock signals. This can be seen by the clean sinusoid waveforms after the time indicator 912, which result from the zero-current events that are detected by the zero-current detector 702. It should be noted that regardless of whether the synchronized clocks generated by the zero-current detector 702 or alternate clocks generated by the alternate clock generator 704 are utilized, the resonant charge pump circuit continues to output a stable 24-volt output as illustrated in graph 910.

Low EMI Circuit Operation

In various embodiments, the resonant charge pump circuit operates with very low noise. For example, during low load current conditions, the resonant charge pump is not synchronized and operates based on the alternate clock. Since the energy that flows is so low, the circuit emits low EMI. During synchronous operation of the resonant charge pump circuit, the circuit operates using zero-current-switching (ZCS). This operating mode is well known to provide very good noise performance because high power transistors are switching when no current is flowing. Generally, EMI noise power comes from sudden changes of current flow, but the resonant charge pump circuit utilizes ZCS, which results in low EMI.

Although certain specific embodiments are described above for instructional purposes, the teachings of this patent document have general applicability and are not limited to the specific embodiments described above. The function of the hardware circuitry illustrated in the figures can be implemented in hardware circuitry as shown, or in a combination of dedicated hardware circuitry and software, or largely in software. Accordingly, various modifications, adaptations, and combinations of various features of the described embodiments can be practiced without departing from the scope of the invention as set forth in the claims.

What is claimed is:

1. A resonant charge pump circuit, comprising:
   a first switching element connected to a second switching element at a first node, the first and the second switching elements connected in series between an input terminal and an output terminal;
   a resonant circuit connected between the first node and a second node, the resonant circuit having a bucket capacitor and a bucket inductor connected in series; and
   a synchronization circuit connected to the second node and operable to output a first control signal and a second control signal, the synchronization circuit comprising an alternate clock generator that is operable to cause the first and the second control signals to be output when a predetermined current level is not detected at the second node, wherein:
   the first and the second control signals are synchronized and complementary;
   the first control signal is operable to control a state of the first switching element; and
   the second control signal is operable to control a state of the second switching element.

2. The resonant charge pump circuit of claim 1, further comprising:
   a first diode connected between the input terminal and the first node; and
   a second diode connected between the first node and the output terminal.

3. The resonant charge pump circuit of claim 1, wherein:
   the first control signal is operable to cause the first switching element to connect the input terminal to the resonant circuit when the first switching element is in a first state and cause the first switching element to disconnect the input terminal from the resonant circuit when the first switching element is in a second state; and
   the second control signal is operable to cause the second switching element to connect the resonant circuit to the output terminal when the second switching element is in the second state and to cause the second switching element to disconnect the output terminal from the resonant circuit when the second switching element is in the first state.

4. The resonant charge pump circuit of claim 3, wherein the first and the second switching elements comprise transistors.

5. The resonant charge pump circuit of claim 1, wherein the synchronization circuit synchronizes the switching of the first and the second switching elements to a resonant frequency of the resonant circuit.

6. The resonant charge pump circuit of claim 1, wherein:
   the synchronization circuit comprises a current sensor connected to the second node and a detector circuit connected to the current sensor; and
   the detector circuit is operable to detect a current level through the resonant circuit and cause the first and the second control signals to be output when the predetermined current level is detected.

7. The resonant charge pump circuit of claim 6, wherein:
   the detector circuit is connected to an OR device;
   the alternate clock generator is connected to the OR device, the alternate clock generator operable to output an alternate clock signal; and
   the alternate clock signal is operable to cause the first and the second control signals to be output when the predetermined current level is not detected.

8. The resonant charge pump circuit of claim 7, wherein the predetermined current level is zero current.

9. The resonant charge pump circuit of claim 7, wherein the synchronization circuit comprises:
   a toggle circuit connected to the OR device, the toggle circuit operable to output the first control signal; and
   an inverter connected to the toggle circuit, the inverter operable to output the second control signal; and
   the switching between the first and second states is controlled so that current spikes are reduced.

10. The resonant charge pump circuit of claim 1, comprising:
    a third switching element; and
    a fourth switching element connected to the third switching element at a third node, the third and the fourth switching elements connected in series between the second node and a fourth node,
    wherein the first switching element is connected between the first node and the fourth node.

11. A method for operating a resonant charge pump circuit having a resonant circuit that includes a bucket capacitor and a bucket inductor, the method comprising:
    switching to a first state that enables current to flow from an input terminal into the resonant circuit to charge the bucket capacitor and the bucket inductor;
    switching to a second state that enables current to flow from the resonant circuit to discharge the bucket capacitor and the bucket inductor to an output terminal;
    synchronizing the switching between the first and second states by using a signal output from a detector circuit to cause a first control signal and a second control signal to be output to control the current flows from the input terminal to the output terminal;

determining a current level through the resonant circuit; and based on a determination that the current level is greater than a predetermined current level, synchronizing the switching between the first and second states by using an alternate clock signal output from an alternate clock generator to cause the first control signal and the second control signal to be output to control the current flows from the input terminal to the output terminal, wherein:

the first and the second control signals are synchronized and complementary;

the first control signal controls the switching to the first state; and the second control signal controls the switching to the second state.

12. The method of claim 11, further comprising:
connecting the input terminal to the resonant circuit using a first diode; and
connecting the resonant circuit to the output terminal using a second diode.

13. The method of claim 11, further comprising:
connecting the input terminal to the resonant circuit when in the first state and disconnecting the input terminal from the resonant circuit when in the second state; and
connecting the resonant circuit to the output terminal when in the second state and disconnecting the output terminal from the resonant circuit when in the first state.

14. The method of claim 11, wherein the synchronizing of the switching between the first and second states by using the signal output from the detector circuit comprises synchronizing the switching between the first and second states to a resonant frequency of the resonant circuit.

15. The method of claim 11, wherein the synchronizing of the switching between the first and second states by using the signal output from the detector circuit comprises generating the first and the second control signals using the signal output from the detector circuit to control the switching when the predetermined current level is detected.

16. The method of claim 15, wherein the predetermined current level is zero current.

17. The method of claim 11, wherein the synchronizing of the switching between the first and second states by using the signal output from the detector circuit controls the switching between the first and the second states so that current spikes are reduced.

18. A resonant charge pump circuit, comprising:
a resonant circuit;
means for switching connected to the resonant circuit, wherein the means for switching switches between a first state that enables current to flow from an input terminal into the resonant circuit, and a second state that enables current to flow from the resonant circuit to an output terminal; and
means for synchronizing that uses a signal output from a detector circuit to cause a first control signal and a second control signal to be output to control current flows from the input terminal to the output terminal;
means for determining a current level through the resonant circuit; and
based on a determination that the current level is greater than a predetermined current level, means for synchronizing the switching between the first and second states that uses an alternate clock signal output from an alternate clock generator to cause the first control signal and the second control signal to be output to control the current flows from the input terminal to the output terminal, wherein:

the first and the second control signals are synchronized and complementary;

the first control signal controls the switching to the first state; and the second control signal controls the switching to the second state.

19. The resonant charge pump circuit of claim 18, further comprising:
a first switching element that connects the input terminal to the resonant circuit when the means for switching is in the first state and disconnects the input terminal from the resonant circuit when the means for switching is in the second state; and
a second switching element that connects the resonant circuit to the output terminal when the means for switching is in the second state and disconnects the output terminal from the resonant circuit when the means for switching is in the first state.

20. The resonant charge pump circuit of claim 18, wherein the means for synchronizing using the signal output from the detector circuit synchronizes the means for switching to switch between the first state and the second state at a resonant frequency of the resonant circuit.

* * * * *